United States Patent
Fahrbach et al.

(10) Patent No.: US 12,044,836 B2
(45) Date of Patent: Jul. 23, 2024

(54) METHOD AND MICROSCOPE FOR THE HIGH-RESOLUTION IMAGING OF A SPECIMEN BY LIGHT MICROSCOPY

(71) Applicant: LEICA MICROSYSTEMS CMS GMBH, Wetzlar (DE)

(72) Inventors: Florian Fahrbach, Mannheim (DE); Werner Knebel, Kronau (DE); Ulf Schwarz, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 545 days.

(21) Appl. No.: 17/413,611

(22) PCT Filed: Nov. 22, 2019

(86) PCT No.: PCT/EP2019/082247
§ 371 (c)(1),
(2) Date: Jun. 14, 2021

(87) PCT Pub. No.: WO2020/120105
PCT Pub. Date: Jun. 18, 2020

(65) Prior Publication Data
US 2022/0043248 A1 Feb. 10, 2022

(30) Foreign Application Priority Data
Dec. 14, 2018 (DE) .............. 10 2018 132 212.7

(51) Int. Cl.
*G02B 21/00* (2006.01)
*G01N 21/64* (2006.01)

(52) U.S. Cl.
CPC ..... *G02B 21/0076* (2013.01); *G02B 21/0032* (2013.01); *G01N 21/6458* (2013.01)

(58) Field of Classification Search
CPC .. G02B 21/076; G02B 21/0032; G02B 21/00; G02B 21/0004; G02B 21/002;
(Continued)

(56) References Cited

U.S. PATENT DOCUMENTS

2001/0045529 A1* 11/2001 Iketaki ............... G02B 21/16
250/493.1
2002/0167724 A1* 11/2002 Iketaki ............... G02B 21/06
359/368
(Continued)

FOREIGN PATENT DOCUMENTS

DE 102005027896 B4 3/2012
DE 19980759 B3 * 10/2016 ........... G01N 21/636
(Continued)

OTHER PUBLICATIONS

Wang, Yifan et al. "Dual-mode super-resolution imaging with stimulated emission depletion microscopy and fluorescence emission difference microscopy", Applied Optics, vol. 54, Nr. 17, Jun. 10, 2015 (Jun. 10, 2015), pp. 5425-5431, XP055507550, Washington, DC; US.
(Continued)

*Primary Examiner* — Arnel C Lavarias
(74) *Attorney, Agent, or Firm* — LEYDIG, VOIT & MAYER, LTD.

(57) ABSTRACT

A method for high-resolution imaging includes illuminating a target region of a specimen by first and second illumination light beams during respective holding durations to transfer respective subsets of fluorophores from a first into a second state. The fluorophores emit fluorescence photons upon
(Continued)

transition from the second back into the first state, which are used to produce respective raw images. The illumination light beams have different power and/or beam profiles. A high-resolution image is produced from the raw images. The respective holding durations are shorter than a lifetime of a third state of the fluorophores, into which a third subset of the fluorophores is transferred by the illumination of the target region by the first and/or second illumination light beam, and the lifetime of the third state is longer by a factor of at least 2 than a lifetime of the second state.

16 Claims, 8 Drawing Sheets (58) Field of Classification Search
CPC ............ G02B 21/0024; G02B 21/0052; G02B 21/006; G02B 21/0064; G02B 21/0068; G02B 21/0076; G02B 21/0072; G02B 21/008; G02B 21/06; G02B 21/36; G02B 21/361; G02B 21/365; G02B 21/367; G01N 21/6458; G01N 21/6456; G01N 2021/6463; G01N 21/6486; G01N 21/6408; G01N 2021/6413; G01N 2021/6415
USPC ....... 359/385, 362, 363, 368, 369, 387, 388, 359/390
See application file for complete search history.

(56) References Cited

U.S. PATENT DOCUMENTS

| | | | |
|---|---|---|---|
| 2007/0013909 A1* | 1/2007 | Hell | G02B 21/16 250/458.1 |
| 2008/0088839 A1 | 4/2008 | Hell et al. | |
| 2008/0192262 A1* | 8/2008 | Enderlein | G02B 21/0076 356/610 |
| 2016/0187259 A1* | 6/2016 | Vicidomini | G01N 21/6428 250/206 |
| 2017/0176337 A1* | 6/2017 | Kalkbrenner | G02B 21/16 |
| 2021/0372928 A1* | 12/2021 | Sitters | G02B 21/26 |

FOREIGN PATENT DOCUMENTS

| | | | |
|---|---|---|---|
| WO | WO 2006/127692 A2 | 11/2006 | |
| WO | WO-2009141410 A1 * | 11/2009 | ......... G01N 21/6428 |

OTHER PUBLICATIONS

Oketani, Ryosuke et al. "Saturated two-photon excitation fluorescence microscopy with core-ring illumination", Optics Letters, vol. 42, Nr. 3, Feb. 1, 2017, pp. 571-574, XP055669712, US.

Jia, Hao et al. "Axial resolution enhancement of light-sheet microscopy by double scanning of Besse' beam and its complementary beam", Journal of Biophotonics, vol. 12, Nr. 1, Aug. 20, 2018 (Aug. 20, 2018), XP055669358, Wiley-VCH, Germany.

Fahrbach, Florian O. et al. "Light-sheet microscopy in thick media using scanned Bessel beams and two-photon fluorescence excitation", Optics Express, vol. 21, Nr. 11, May 31, 2013 (May 31, 2013), pp. 13824-13839, XP055478847.

Noomnarm, Ulai and Robert M. Clegg, "Fluorescence lifetimes: fundamentals and interpretations", Photosynthesis Research ; Official Journal of the International Society of Photosynthesis Research, Springer, Berlin, DE, vol. 101, Nr. 2-3, Jul. 1, 2009 (Jul. 1, 2009), pp. 181-194, XP019733175.

Ward, Edward N. et al. "Enhancing multi-spot structured illumination microscopy with fluorescence difference", Royal Society Open Science, vol. 5, Nr. 3, Mar. 1, 2018 (Mar. 1, 2018), p. 171336, XP055669880, UK.

Meiniel, William et al. "Denoising of Microscopy Images: A Review of the State-of-the-Art, and a New Sparsity-Based Method", IEEE Transactions on Image Processing, IEEE Service Center, Piscataway, NJ, US, vol. 27, Nr. 8, Aug. 1, 2018 (Aug. 1, 2018), pp. 3842-3856, XP011683064.

Enderlein, Jörg, "Breaking the diffraction limit with dynamic saturation optical microscopy," Appl. Phys. Lett. 87, 094105 (2005), Aug. 23, 2005, American Institute of Physics, US.

Fujita, Katsumasa et al., "High-Resolution Confocal Microscopy by Saturated Excitation of Fluorescence," Phys. Rev. Lett. 99, 228105 (2007), week ending Nov. 30, 2007, American Physical Society, US.

Yamanaka, Masahito et al., Journal of Biomedical Optics 13, 050507, vol. 13(5), Oct. 9, 2008, SPIE, US.

Yamanaka, Masahito et al. "SAX microscopy with fluorescent nanodiamond probes for high-resolution fluorescence imaging," Biomed. Opt. Express 2, pp. 1946-1954 (2011), Jul. 1, 2011, Optical Society of America, US.

Humpolickova, Jana et al. "Optical Saturation as a Versatile Tool to Enhance Resolution in Confocal Microscopy," Biophys. J. 97, pp. 2623-2629, Nov. 2009, Cell Press, US.

Kuang, Cuifang et al., "Breaking the Diffraction Barrier Using Fluorescence Emission Difference Microscopy," Sci. Rep. 3, 1441 (2013), Mar. 13, 2013, pp. 1-6, Nature Research, UK.

Zhao, Guangyuan et al. "Saturated absorption competition microscopy," Optica 4, pp. 633-636, Jun. 2017, The Optical Society, US.

Zhang, Yide et al., "Super-resolution fluorescence microscopy by stepwise optical saturation," arXiv:1801,03201v1, Jan. 10, 2018, pp. 1-14, arXiv, US.

* cited by examiner

METHOD AND MICROSCOPE FOR THE HIGH-RESOLUTION IMAGING OF A SPECIMEN BY LIGHT MICROSCOPY

CROSS-REFERENCE TO PRIOR APPLICATIONS

This application is a U.S. National Phase application under 35 U.S.C. § 371 of International Application No. PCT/EP2019/082247, filed on Nov. 22, 2019, and claims benefit to German Patent Application No. DE 10 2018 132 212.7, filed on Dec. 14, 2018. The International Application was published in German on Jun. 18, 2020 as WO 2020/120105 A1 under PCT Article 21(2).

FIELD

The invention relates to a method for the high-resolution imaging of a specimen by light microscopy, in which a target region of a specimen is illuminated by means of a first illumination light beam during a first holding duration in order to transfer at least a first subset of fluorophores in the specimen from a first state into a second state. This first subset of the fluorophores emits fluorescence photons upon the transition from the second state back into the first state, which fluorescence photons are used to produce a first raw image. The target region of the specimen is illuminated using a second illumination light beam, which has a power different from the power of the first illumination light beam and/or a beam profile different from the beam profile of the first illumination light beam, during a second holding duration in order to transfer at least a second subset of the fluorophores in the specimen from the first state into the second state. This second subset of the fluorophores emits fluorescence photons upon the transition from the second state back into the first state, which fluorescence photons are used to produce a second raw image. Furthermore, a high-resolution image of the specimen is produced from the first raw image and the second raw image. The invention furthermore relates to a microscope for the high-resolution imaging of a specimen by light microscopy.

BACKGROUND

A method is disclosed in DE 10 2005 027 896 B4, in which fluorescent pigments in a specimen are excited using pulsed laser light. The time interval between successive laser pulses is set so that it is longer than the lifetime of an excited state into which the fluorescent pigment is excited out of the ground state by the laser pulse.

A method for increasing resolution by a chronological analysis of a fluorescence signal is disclosed in *Enderlein, Appl. Phys. Lett.* 87, 094105 (2005). The method is carried out using a confocal scanning microscope. In the method, the first microseconds after the beginning of the irradiation of the fluorophores using pulsed light are analyzed.

A method is described in Fujita et al., *Phys. Rev. Lett.* 99, 228105 (2007), which is based on studying a dependence of a fluorescence yield on the intensity of laser light, which excites a fluorescent pigment arranged in a specimen to emit fluorescent light. An observed saturation is used for the super resolution. In the method, the illuminance of the light is modulated at a frequency fm in the kilohertz range and detected at a higher frequency which is an integer multiple of the frequency f, i.e., 2f, 3f, etc. which is also referred to as harmonic demodulation. The method requires rapid detectors having readout speeds in the kilohertz range. A large part of the fluorescent light is not detected at all by the demodulated detection. The method additionally has a disadvantageously long recording time. The authors report that in microparticles, so-called "beads", a holding duration per pixel is 0.2 ms. In an image having 512×512 pixels, this corresponds to a recording time of 52 seconds. Furthermore, strong photobleaching is criticized in this method, i.e., the loss of fluorescence capability of a fluorescent pigment caused by irradiation.

A further method is described in Yamanaka et al., *Journal of Biomedical Optics* 13, 050507 (2008) and Yamanaka 2011, *Biomed. Opt. Express* 2, 1946 (2011), which builds on the above-described method according to Fujita et al. Photobleaching is also mentioned as a significant disadvantage of this method.

A method is described in Humpolickova et al., *Biophys. J.* 97, 2623 (2009), which is based on a direct measurement of a saturation curve of a fluorescence signal. A time-modulated illumination is also used in this method.

A method is described in Kuang, C. et al., *Sci. Rep.* 3, 1441 (2013), in which a high-resolution image of a specimen is produced from two raw images recorded with differing intensity and differing beam profile of a pulsed laser. The disadvantage of this method is that the recording speed is not high enough to be able to observe certain dynamic processes.

A method is described in Zhao, *Optica* 4, 633 (2017), which is referred to as saturated absorption competition microscopy. In this method, a first light beam, which has a Gaussian cross section, is superimposed with a second light beam of equal wavelength which has a doughnut-shaped cross section. A specimen is scanned point by point using the two light beams, wherein at each point the first light beam excites fluorescence and the second light beam is used at comparatively high intensity to saturate fluorophores in the edge region of the first light beam. To be able to extract the effect of the saturation from the superimposed fluorescence signal, the first light beam is time-modulated and the signal is measured via a lock-in amplifier. The fluorophores excited in the edge region of the focus by the second light beam have to have relaxed before a reasonable measurement can be made there. This means that corresponding waiting times have to be planned in if adjacent points in the specimen are to be scanned in succession, so that the recording time lengthens.

A method for stepwise optical saturation, also abbreviated as SOS, is described in Zhang et al., arXiv 1.10.2018. In the method, a number of M images is recorded to achieve a resolution increase by a factor of $\sqrt{M}$. For this purpose, the M images are offset with one another.

SUMMARY

In an embodiment, the present invention provides a method for high-resolution imaging of a specimen by light microscopy. A target region of a specimen is illuminated by a first illumination light beam during a first holding duration, in order to transfer at least a first subset of fluorophores in the specimen from a first state into a second state, wherein the first subset of the fluorophores emits fluorescence photons upon the transition from the second state back into the first state, and wherein the fluorescence photons are used to produce a first raw image. The target region of the specimen is illuminated by a second illumination light beam, which has a power different from a power of the first illumination light beam and/or a beam profile different from a beam profile of the first illumination light beam, during a second holding duration, in order to transfer at least a second subset of the fluorophores in the specimen from the first state into the second state, wherein the second subset of the fluorophores emits fluorescence photons upon the transition from the second state back into the first state, and wherein the fluorescence photons are used to produce a second raw image. A high-resolution image of the specimen is produced from the first raw image and the second raw image. The first holding duration and the second holding duration are shorter than a lifetime of a third state of the fluorophores, into which a third subset of the fluorophores is transferred by the illumination of the target region of the specimen by the first illumination light beam and/or the second illumination light beam, and the lifetime of the third state is longer by a factor of at least 2 than a lifetime of the second state.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 includes sub-views a)-d), referred to below as FIG. 3a, FIG. 3b, FIG. 3c and FIG. 3d, respectively, wherein.

FIG. 4 includes sub-views a-d, referred to below as FIG. 4a, FIG. 4b, FIG. 4c and FIG. 4d, respectively, wherein.

FIG. 5 includes sub-views a and b, referred to below as FIG. 5a and FIG. 5b, respectively, wherein.

FIG. 6 includes sub-views a-d, referred to below as FIG. 6a, FIG. 6b, FIG. 6c and FIG. 6d, respectively, wherein.

DETAILED DESCRIPTION

In an embodiment, the present invention provides a method for high-resolution imaging of a specimen by light microscopy, which enables higher resolution and better image contrast than previously known methods and can be carried out faster at the same time. In another embodiment, the present invention provides a microscope using which the method according to an embodiment of the present invention can be carried out.

In the method according to an embodiment of the invention for high-resolution imaging of a specimen by light microscopy, a target region of a specimen is illuminated by means of a first illumination light beam during a first holding duration in order to transfer at least a first subset of fluorophores in the specimen from a first state into a second state. This first subset of the fluorophores emits fluorescence photons upon the transition from the second state back into the first state, which fluorescence photons are used to produce a first raw image. The target region of the specimen is illuminated by means of a second illumination light beam, which has a power different from the power of the first illumination light beam and/or a beam profile different from the beam profile of the first illumination light beam, during a second holding duration in order to transfer at least a second subset of the fluorophores in the specimen from the first state into the second state. This second subset of the fluorophores emits fluorescence photons upon the transition from the second state back into the first state, which fluorescence photons are used to produce a second raw image. Furthermore, a high-resolution image of the specimen is produced from the first raw image and the second raw image. The first holding duration and the second holding duration are shorter than the lifetime of a third state of the fluorophores, into which a third subset of the fluorophores is transferred by the illumination of the target region of the specimen by means of the first illumination light beam and/or the second illumination light beam and its lifetime is longer by a factor of at least 2 than the lifetime of the second state.

Holding duration is understood in the present application as the maximum time period in which the respective target region is illuminated by the first or second illumination light beam. Irradiation power (or power in short) is understood in this application as the time-averaged illuminance (intensity) integrated over the illuminated area of the respective illumination light beam. In the present application, beam profile means the transverse intensity profile of the first or second illumination light beam. Possible beam profiles are implemented in particular by Gaussian beams, Bessel beams, and Airy beams.

The two subsets of the fluorophores can be identical or different. In particular, the two subsets can also overlap.

An embodiment of the present invention is based on the use of the nonlinear dependence of the fluorescence photons emitted upon the transition from the second state into the first state on the intensity of the illumination light beam at the location of the fluorophore. In particular, an embodiment of the invention is based on the fact that one of the two illumination light beams which illuminates fluorophores for a time period which is shorter than the lifetime of the second state, can excite at most each of the fluorophores arranged in the target region. In this way, the number of fluorophores which can still additionally be excited by a higher power of the illumination light beam decreases, since a majority of the fluorophores has already been transferred into an excited state at lower power.

According to an embodiment of the invention, at least two raw images of the specimen are produced to produce a high-resolution image of the specimen. The two raw images are each produced in that the target region of the specimen is illuminated by means of one of the two illumination light beams. The two illumination light beams have different beam parameters, i.e., they differ from one another in particular in their power and/or their beam profile. Since the powers of the two illumination light beams are not each uniformly distributed over the cross section of the respective illumination light beam, in each case the entire target region is not illuminated using the same illuminance. The number of emitted fluorescence photons is thus also not uniformly distributed over the target region. The target region is so to speak divided into various regions in this way. This division may be influenced in particular by selecting the beam parameters.

Since the number of the fluorescence photons emitted in the various regions of the target region is nonlinearly dependent on the illuminance of the illumination light beam in the various regions, the various regions can be separated from one another, for example by subtraction of the first raw image from the second raw image or vice versa. Since the various regions are smaller than the respective beam diameter of the two illumination light beams, this corresponds to an improvement of the resolution and the image contrast. In light sheet microscopes, this in turn corresponds to an improvement of the axial resolution.

The method according to an embodiment of the invention utilizes a saturation of the second state instead of a saturation of the third state. The lifetime of the second state is shorter than the lifetime of the third state. The first holding duration and the second holding duration can thus be selected to be significantly shorter than the lifetime of the third state, since it is not necessary to wait between two successive recordings until the majority of the fluorophores has passed from the third state back into the first state. The method according to an embodiment of the invention can therefore be carried out faster than previously known methods which are based on a saturation of the third state.

The lifetime of the third state of the fluorophores is preferably longer than the lifetime of the second state by a factor of at least 10, at least 50, or at least 100. The lifetime of the third state of the fluorophores is preferably longer than the lifetime of the second state by a factor of at most 10, at most 100, or at most 1000, wherein in these cases the lower limit is preferably 2 for an upper limit of 10, 2 or 10 for an upper limit of 100, and 2, 10, or 100 for an upper limit of 1000.

It is obvious that in the method according to an embodiment of the invention, more than two raw images can also be produced, from which the high-resolution image of the specimen is produced. One of the two illumination light beams or a further illumination light beam is associated with each further raw image.

Preferably, the first holding duration and/or the second holding duration are shorter than the lifetime of the second state. This means that the target region is illuminated by each of the two illumination light beams for a time period which is shorter than the lifetime of the second state. In this way, all fluorophores arranged in the target region can be excited at most once from the first state into the second state, whereby undesired phototoxic effects are avoided.

It is advantageous if the target region of the specimen is repeatedly illuminated by means of the first illumination light beam and/or the second illumination light beam. In particular, the target region is illuminated by means of the first illumination light beam and/or the second illumination light beam to record further raw images. In particular, a sequence of high-resolution images of the specimen can be obtained in this way, with the aid of which dynamic processes in the specimen may be observed. The time interval between two repetitions is preferably longer than the lifetime of the third state. This ensures that as few fluorophores as possible are in the third state when the target region is illuminated again. In this way, saturation of the fluorophores does not occur in the third state, which would reduce the yield of fluorescence photons.

The first illumination light beam and/or the second illumination light beam are preferably generated by a pulsed light source, wherein the pulse length respectively corresponds to the first holding duration or the second holding duration. This is a particularly simple way of implementing the two holding durations.

It is advantageous if the time interval between two pulses of the first illumination light beam and/or the second illumination light beam is longer than the lifetime of the second state. The time interval is selected in this way so that a majority of the fluorophores arranged in the target region pass from the second state back into the first state between two pulses. Undesired saturation of the fluorophores is avoided in this way.

The time interval between two pulses of the first illumination light beam and/or the second illumination light beam is preferably shorter than the lifetime of the third state.

A light sheet illuminating the target region of the specimen is preferably formed from the first illumination light beam and/or the second illumination light beam. In particular, a light sheet which has a high axial resolution may be formed by the method according to an embodiment of the invention.

Alternatively or additionally, a point pattern illuminating the target region of the specimen is formed from the first illumination light beam and/or the second illumination light beam. The target region is scanned by means of each of these point patterns. The speed at which the target region is illuminated by means of the two illumination light beams is increased in this way, since multiple points in the target region are illuminated simultaneously.

It is advantageous if a noise reduction operation is applied to the first raw image and the second raw image. The image quality of the high-resolution image of the specimen produced from the two raw images is further improved in this way.

Preferably, in the context of the further processing, the first raw image is scaled or weighted with the power of the first illumination light beam and the second raw image is scaled or weighted with the power of the second illumination light beam. The further processing of the two raw images to form the high-resolution image of the specimen is significantly simplified in this way.

The high-resolution image of the specimen is preferably produced in that the first raw image is subtracted from the second raw image. A subtraction has the advantage in particular that sensor-specific noise, which is also referred to as "fixed pattern noise" and occurs in CMOS elements, for example, is easily removed.

Alternatively or additionally, preprocessed images which have been produced from the two raw images are used to produce the high-resolution image of the specimen. The preprocessed images are obtained by one or more image processing operations from the two raw images. The image processing operations can be in particular the above-mentioned noise reduction operation, a digital filter operation, a deconvolution, and/or the subtraction of a background image, i.e., an image which was recorded by means of the sensor used, without light being incident on the sensor, or a plurality of such images.

An embodiment of the invention furthermore relates to a microscope for high-resolution imaging of a specimen by light microscopy. The microscope has an illumination device, which is designed to illuminate a target region of a specimen by means of a first illumination light beam during a first holding duration, in order to transfer at least a first subset of fluorophores in the specimen from a first state into a second state, wherein this first subset of the fluorophores emits fluorescence photons upon the transition from the second state back into the first state, and to illuminate the target region of the specimen by means of a second illumination light beam, which has a power different from the power of the first illumination light beam and/or a beam profile different from the beam profile of the first illumination light beam, during a second holding duration, in order to transfer at least a second subset of the fluorophores in the specimen from the first state into the second state, wherein this second subset of the fluorophores emits fluorescence photons upon the transition from the second state back into the first state. The microscope additionally has an image generating device, which is designed to produce a first raw image from the fluorescence photons emitted by the first subset of the fluorophores and to produce a second raw image from the fluorescence photons emitted from the second subset of the fluorophores; and an image processing device, which is designed to produce a high-resolution image of the specimen from the first raw image and the second raw image. The first holding duration and the second holding duration are shorter than the lifetime of a third state of the fluorophores, into which a third subset of the fluorophores is transferred by the illumination of the target region of the specimen by means of the first illumination light beam and/or the second illumination light beam and the lifetime of which is longer by a factor of at least 2 than the lifetime of the second state.

The microscope is, for example, a light sheet microscope or a confocal microscope.

The illumination device preferably comprises a pulsed light source. The two holding durations may be implemented particularly easily using such a pulsed light source. Alternatively or additionally, the illumination device comprises a beam deflection unit for moving the illumination beam over the specimen. Preferably, the first illumination light beam is moved at a first velocity and the second illumination light beam is moved at a second velocity over the specimen, wherein the first velocity and the second velocity are greater than the quotient of the diameter of the first illumination light beam and the lifetime of the second state.

The image generating device preferably comprises a surface sensor element for acquiring the first raw image and the second raw image. The surface sensor element is, for example, a CCD or CMOS element.

Further features and advantages of embodiments of the invention result from the following description, which explains the invention in greater detail on the basis of exemplary embodiments in conjunction with the appended figures.

Figure 1:
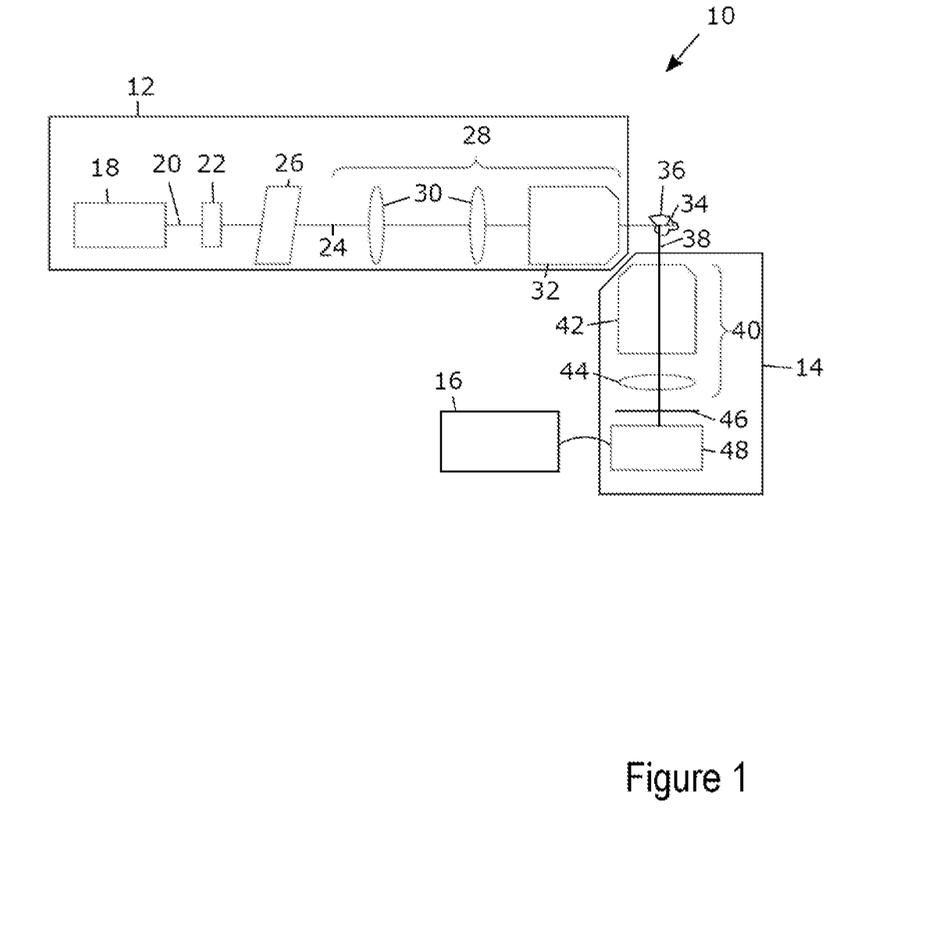
FIG. 1 shows a schematic illustration of a microscope according to the invention as an exemplary embodiment.

FIG. 1 shows a schematic illustration of a microscope 10 according to the invention as an exemplary embodiment. The microscope 10 comprises an illumination device 12, an image generating device 14, and an image processing device 16.

The illumination device 12 comprises a light source 18 for generating illumination light 20, a beam forming unit 22, a beam deflection device 26, and an illumination optical unit 28. The beam forming unit 22 is formed in particular by one or more cylinder lenses, gratings, axicon laser beam formers, spatial light modulators (SLM), digital micromirror devices (DMD), or deformable mirrors (DM). The illumination optical unit 28 comprises a telecentric system 30 consisting of a scanning lens and a tube lens and an illumination objective 32.

The image generating device 14 comprises a detection optical unit 40 and a sensor element 48. The detection optical unit 40 comprises a detection objective 42, a tube lens 44, and an emission filter 46. The sensor element 48 is, for example, a surface sensor, in particular a CCD or CMOS element, an EMCCD element (EMCCD: electron multiplying charge-coupled device), or one of the above-mentioned elements having an amplifier that can be modulated at high frequency with respect to time connected upstream or a point sensor having a high time resolution.

A first illumination light beam and, chronologically following the first illumination light beam, a second illumination light beam, which are identified by the shared reference sign 24 in FIG. 1 for the sake of simplicity, are formed from the illumination light 20 by the beam forming unit 22. The two illumination light beams 24 are oriented by the beam deflection unit 26 and the illumination optical unit 28 of the illumination device 12 on or in a target region 34 of a specimen 36. The two illumination light beams 24 can be moved on or inside the specimen 36 by the beam deflection unit 26.

The two illumination light beams 24 excite fluorophores arranged in the target region 34 from a first state Z1 into a second state Z2. This excitation is described in greater detail below on the basis of FIG. 8. Upon the transition from the second state Z2 back into the first state Z1, the fluorophores emit fluorescence photons, which form fluorescent light 38. The fluorescent light 38 is oriented by the detection optical unit 40 on the sensor element 48 to produce raw images associated with one of the two illumination light beams 24 in each case.

The image processing device 16 produces a high-resolution image of the specimen 34 from the two raw images.

Figure 2:
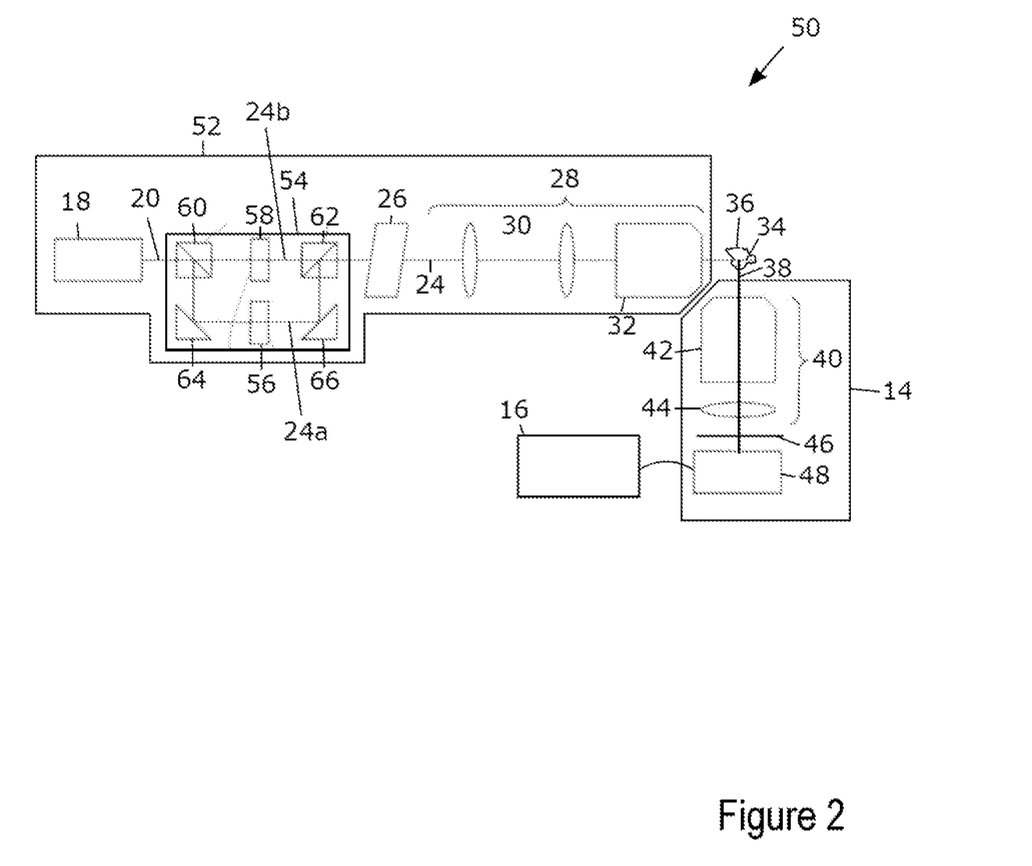
FIG. 2 shows a schematic illustration of the microscope according to the invention as a further exemplary embodiment.

FIG. 2 shows a schematic illustration of a microscope 50 according to the invention as a further exemplary embodiment. The microscope 50 shown in FIG. 2 differs from the microscope 10 shown in FIG. 1 essentially in that the illumination device 52 comprises a unit 54 for producing two illumination light beams 24a, 24b having different beam profiles. Identical or identically acting elements are identified by the same reference signs in FIGS. 1 and 2.

The unit 54 comprises two beam forming units 56, 58, two beam splitters 60, 62, and two deflection mirrors 64, 66. A part of the illumination light 20 is decoupled from the beam path of the illumination unit 52 by the first beam splitter 60 and deflected via the first deflection mirror 64 onto a first beam forming unit 56 to produce the first illumination light beam 24a. After leaving the first beam forming unit 56, the first illumination light beam 24a is deflected by the second deflection mirror 66 onto the second beam splitter 62, which couples the first illumination light beam 24a back into the beam path of the illumination device 52. The non-decoupled part of the illumination light 20 is formed by the second beam forming unit 58 to form the second illumination light beam 24b. After leaving the unit 54, the two illumination light beams 24a, 24b are again identified in FIG. 2 by the shared reference sign 24 for the sake of simplicity. The two illumination light beams 24a, 24b can be produced simultaneously or in succession.

If a broadband light source is used, in particular spectral beam splitting can be carried out by the two beam splitters 60, 62. The powers of the two illumination light beams 24a, 24b are then dependent on the spectral width of the two illumination light beams 24a, 24b.

Alternatively, two light sources can be used, the wavelengths of which are offset from one another slightly, for example by a few nanometers, in particular in the range of 1 nm to 100 nm, for example 20 nm, wherein the two wavelengths are within the absorption spectrum of the fluorophores.

In particular, the two beam splitters 60, 62 can also be acoustooptical deflectors (AOD). In this embodiment, the two illumination light beams 24a, 24b can moreover have a different wavelength and/or polarization.

The two beam splitters 60, 62 can also be beam splitters having a color-dependent and/or polarization-dependent splitting ratio. In this way, for example, interference effects of the two illumination light beams 24a, 24b in the specimen 36 can be utilized. Alternatively, the two illumination light beams 24a, 24b can be delayed in relation to one another upon use of a pulsed light source so that they do not chronologically overlap. The delay is preferably within the lifetime of the second state Z2, but ideally significantly less.

Figure 3:
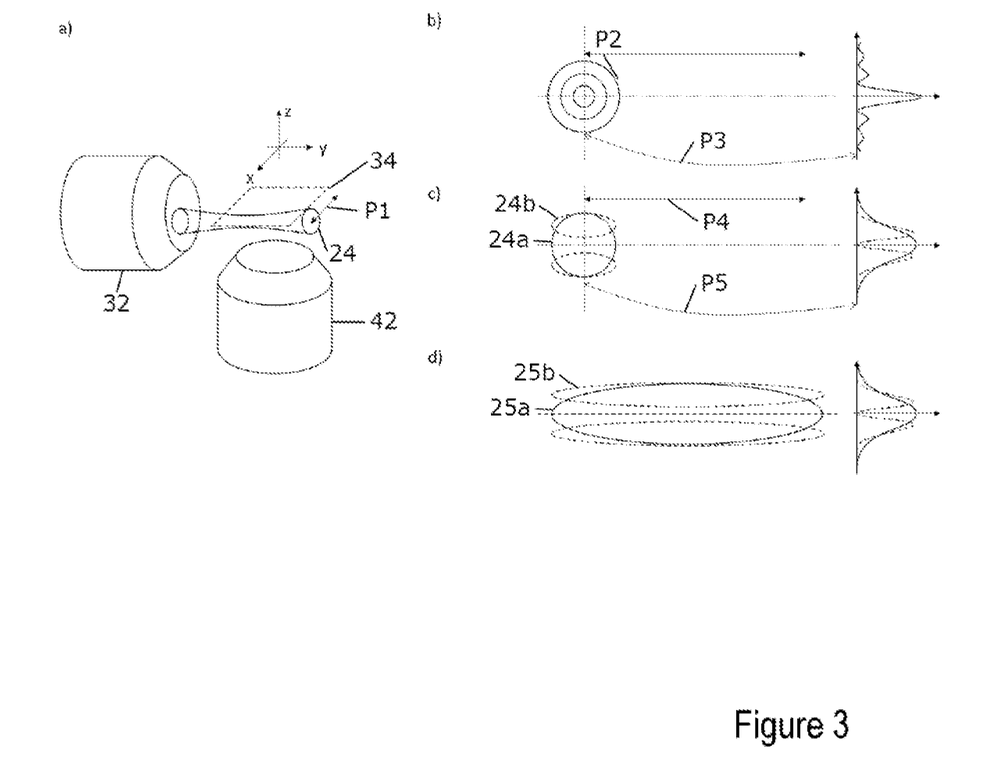
FIG. 3a shows a schematic illustration of an illumination objective and a detection objective of the microscope according to the invention from FIGS. 1 and 2.
FIG. 3b shows a schematic illustration of an illumination light beam of the microscope according to the invention from FIGS. 1 and 2.
FIG. 3c shows a schematic illustration of a first illumination light beam and a second illumination light beam of the microscope according to the invention from FIGS. 1 and 2 as an exemplary embodiment.
FIG. 3d shows a schematic illustration of the first illumination light beam and the second illumination light beam of the microscope according to the invention from FIGS. 1 and 2 as a further exemplary embodiment.

FIG. 3a shows a schematic illustration of the illumination objective 32 and the detection objective 42 of the microscope 10, 50 according to an embodiment of the invention. The two illumination light beams are again identified by the shared reference sign 24 in FIG. 3a for the sake of simplicity.

The illumination objective 32 and the detection objective 42 are oriented on the target region 34 and arranged in such a way that their optical axes are perpendicular to one another. The two illumination light beams 24 are moved so that they scan the entire target region 34, which is indicated by a double arrow P1.

FIG. 3b shows a schematic illustration of one of the two illumination light beams 24a, 24b of the microscope 10, 50. In the exemplary embodiment according to FIG. 3b, the illumination light beam is a Besselian beam. The left part of FIG. 3b shows a view of the illumination light beam seen from the illumination objective 32. The solid lines indicate regions of equal illuminance here. The right part of FIG. 3b shows an intensity distribution of the illumination light beam perpendicular to the optical axis of the illumination objective 32.

A scanning movement along the target region 34 is indicated by a double arrow P2 in FIG. 3b. An association of the regions of equal illuminance in the left part of FIG. 3b with the intensity distribution of the illumination light beam in the right part of FIG. 3b is indicated by a double arrow P3.

FIG. 3c shows a schematic illustration of an exemplary implementation of the first illumination light beam 24a and the second illumination light beam 24b of the microscope 10, 50. The left region of FIG. 3c shows the two illumination light beams 24a, 24b seen from the illumination objective 32. The right part of FIG. 3c shows the intensity distribution of each of the two illumination light beams 24a, 24b perpendicular to the optical axis of the illumination objective 32. The first illumination light beam 24a according to FIG. 3c is a Gaussian beam and has a single intensity maximum. The second illumination light beam 24b according to FIG. 3c has two intensity maxima, which are above and below the intensity maximum of the first illumination light beam 24a in the illustration according to FIG. 3c. It is described below on the basis of FIGS. 5a and 5b how this may be used to increase the axial resolution.

A scanning movement along the target region 34 is indicated by a double arrow P4 in FIG. 3c. An association of the regions of equal illuminance in the left part of FIG. 3c with the intensity distributions of the two illumination light beams 24a, 24b in the right part of FIG. 3b is indicated by a double arrow P5.

FIG. 3d shows a schematic illustration of a further exemplary implementation of the first illumination light beam 25a and the second illumination light beam 25b of the microscope 10, 50. The two illumination light beams 25a, 25b according to FIG. 3d differ from the two illumination light beams 24a, 24b according to FIG. 3c essentially in that they are each formed as a light sheet. In the exemplary embodiment according to FIG. 3d, there is therefore also no scanning movement by the two illumination light beams 25a, 25b.

Figure 4:
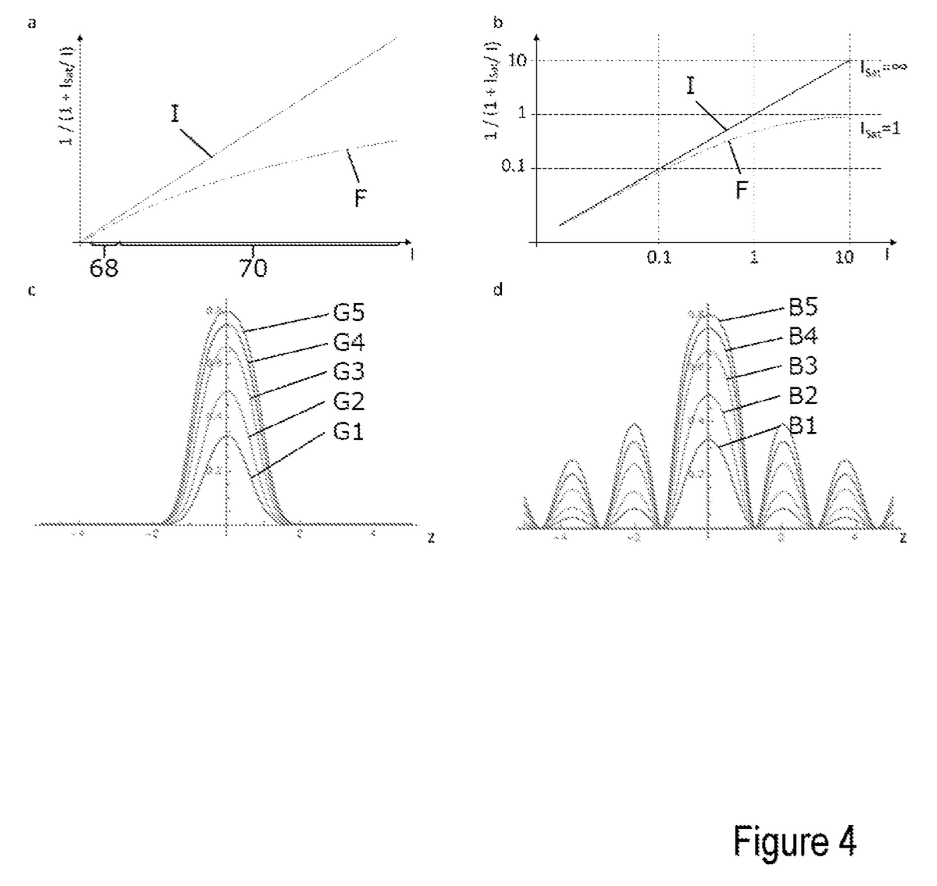
FIG. 4a shows a diagram in which a nonlinear dependence of a number of emitted fluorescence photons on the intensity of the illumination light beams is illustrated in a linear scale.
FIG. 4b shows a diagram in which the nonlinear dependence of the number of emitted fluorescence photons on the intensity of the illumination light beams is illustrated in a double-logarithmic scale.
FIG. 4c shows a diagram in which the location-dependent distribution of the number of emitted fluorescence photons as a function of the location-dependent intensity of Gaussian illumination light beams is illustrated.
FIG. 4d shows a diagram in which the nonlinear dependence of the number of emitted fluorescence photons on the intensity of Besselian illumination light beams is shown.

FIG. 4a is a diagram in which a nonlinear dependence of a number F of emitted fluorescence photons on the intensity I of the illumination light beams 24a, 24b is illustrated in a linear scale. For the number of emitted fluorescence photons F, it is assumed here that $F \propto 1/(1+I_{Sat}/I)$ applies, wherein $I_{Sat}$ is the saturation intensity of the fluorophores. In the illustration according to FIG. 4a, the values of the function $1/(1+I_{Sat}/I)$ are therefore plotted in relation to the scaled intensity $I/I_{Sat}$. A first region 68 can be seen in which the number of emitted fluorescence photons scales approximately linearly with the scaled intensity $I/I_{Sat}$ also shown and thus with the intensity I of the illumination light beams 24a, 24b. In a second region 70, the number of emitted fluorescence photons scales clearly nonlinearly with the intensity $I/I_{Sat}$ and the intensity I of the illumination light beams 24a, 24b.

FIG. 4b is a diagram in which the nonlinear dependence of the number of emitted fluorescence photons F on the intensity I of the illumination light beams 24a, 24b is illustrated in a double logarithmic scale. In the illustration according to FIG. 4b, as in FIG. 4a, the values of the function $1/(1+I_{Sat}/I)$ are plotted in relation to the scaled intensity $I/I_{Sat}$.

FIG. 4c is a diagram in which the location-dependent distribution of the number of emitted fluorescence photons is illustrated as a function of the location-dependent intensity of Gaussian illumination light beams. The position z perpendicular to the propagation direction of the respective illumination light beam is plotted on the abscissa axis. The values of the function $1/(1+I_{Sat}/I(z))$ are plotted on the ordinate axis, which is proportional to the number of emitted fluorescence photons F(z) at the position z. I(z) is the intensity of a Gaussian illumination beam at the position z. A first curve G1 shows the number of emitted fluorescence photons for a Gaussian illumination light beam having an intensity at the position z=0 of $I(z=0)=I_{Sat}/2$. A second curve G2 shows the number of emitted fluorescence photons for a Gaussian illumination light beam having an intensity of $I(z=0)=I_{Sat}$. A third curve G3 shows the number of emitted fluorescence photons for a Gaussian illumination light beam having an intensity of $I(z=0)=2I_{Sat}$. A fourth curve G4 shows the number of emitted fluorescence photons for a Gaussian illumination light beam having an intensity of $I(z=0)=3I_{Sat}$. A fifth curve G5 shows the number of emitted fluorescence photons for a Gaussian illumination light beam having an intensity of $I(z=0)=4I_{Sat}$. It is clear from the consideration of curves G1 to G5 together that the number of emitted fluorescence photons is nonlinearly dependent on the intensity of the Gaussian illumination light beams, since the signal F around z=0 rises less strongly for a further increase of the intensity than in the edge region z>>0 or z<<0, where the same relative increase of the intensity for significantly lower absolute values results in significantly less strongly pronounced saturation effects, F(z) thus rises rather linearly with I(z).

FIG. 4d is a diagram in which the nonlinear dependence of the number of emitted fluorescence photons on the intensity of Besselian illumination light beams is shown. The position z perpendicular to the propagation direction of the respective illumination light beam is plotted on the abscissa axis. The values of the function $1/(1+I_{Sat}/I(z))$ are plotted on the ordinate axis, which is proportional to the number of emitted fluorescence photons F(z) at the position z. A first curve B1 shows the number of emitted fluorescence photons for a Besselian illumination light beam having an intensity of $I(z=0)=I_{Sat}/2$. A second curve B2 shows the number of emitted fluorescence photons for a Besselian illumination light beam having an intensity of $I(z=0)=I_{Sat}$. A third curve B3 shows the number of emitted fluorescence photons for a Besselian illumination light beam having an intensity of $I(z=0)=2I_{Sat}$. A fourth curve B4 shows the number of emitted fluorescence photons for a Besselian illumination light beam having an intensity of $I(z=0)=3I_{Sat}$. A fifth curve B5 shows the number of emitted fluorescence photons for a Besselian illumination light beam having an intensity of $I(z=0)=4I_{Sat}$. It is clear from the consideration of curves B1 to B5 together that the number of emitted fluorescence photons is nonlinearly dependent on the intensity of the Besselian illumination light beams.

Figure 5:
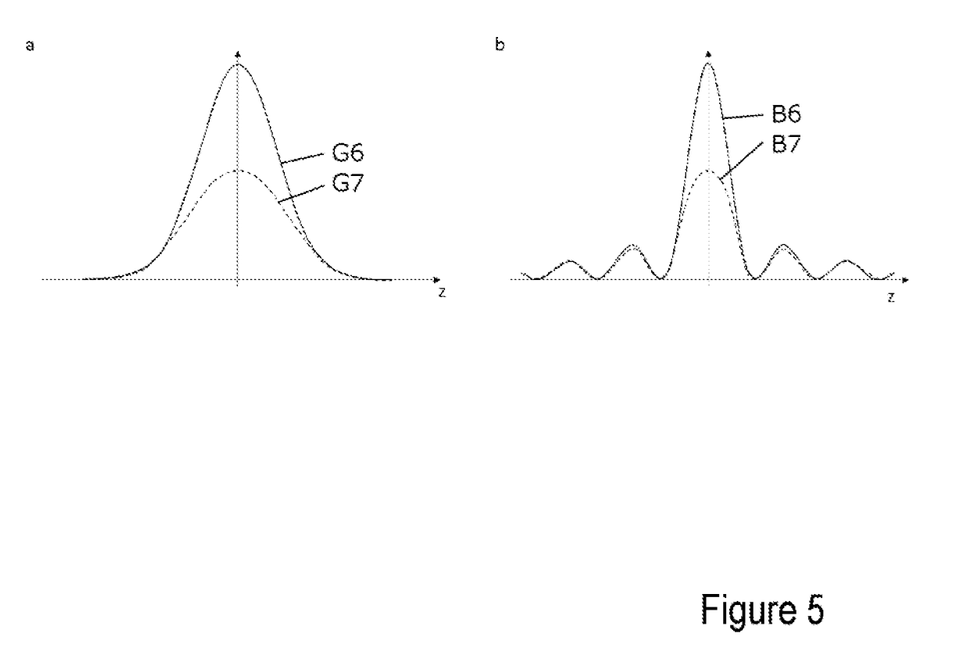
FIG. 5a shows a diagram in which a spatial distribution of emitted fluorescence photons upon an illumination by means of the Gaussian illumination light beams is shown as an exemplary embodiment.
FIG. 5b shows a diagram in which a spatial distribution of emitted fluorescence photons upon an illumination by means of the Besselian illumination light beams is shown as an exemplary embodiment.

FIG. 5a is a diagram in which the spatial distribution of the emitted fluorescence photons upon an illumination with the Gaussian illumination light beams is illustrated. The position z perpendicular to the propagation direction of the respective illumination light beam is plotted on the abscissa axis. The number of emitted fluorescence photons F(z) scaled to the intensity of the respective illumination light beam is plotted on the ordinate axis. A first curve G6 shows the spatial distribution of emitted fluorescence photons for a Gaussian illumination light beam having an intensity in a region in which the number of the emitted fluorescence photons scales linearly with the intensity of the illumination light beam, thus $I(z=0)<I_{Sat}$. A second curve G7 shows the spatial distribution of emitted fluorescence photons for a Gaussian illumination light beam having an intensity in a region in which significant saturation effects occur and the number of the emitted fluorescence photons scales nonlinearly with the intensity of the illumination light beam, i.e., $I(z=0)>I_{Sat}$. The difference between the two curves G6, G7 is an advantageous measured variable, since it only assumes a value which is significantly different from zero in a narrow region around z=0. The difference can be ascertained by subtracting a first raw image associated with the first illumination light beam from a second raw image associated with the second illumination light beam. In the microscope 10, 50 described in FIGS. 1 and 2, the region around z=0 corresponds to a thin region around the focal plane of the detection objective 42. An improved axial resolution and a higher image contrast are thus achieved by a subtraction of the two raw images, in other words a high-resolution and high-contrast image of the specimen 36 is produced.

FIG. 5b shows a diagram in which the spatial distribution of the emitted fluorescence photons upon an illumination using the Besselian illumination light beams is shown. The position z perpendicular to the propagation direction of the respective illumination light beam is plotted on the abscissa axis. The number of emitted fluorescence photons scaled to the intensity of the respective illumination light beam is plotted on the ordinate axis. A first curve B6 shows the spatial distribution of emitted fluorescence photons for a Besselian illumination light beam having a total power which has the result that, even in the region of comparatively high intensities of the main maximum around z=0, the intensity is in a region in which the number of the emitted fluorescence photons scales linearly with the intensity of the illumination light beam, since $I(z)<I_{sat}$ also applies in this region. A second curve B7 shows the spatial distribution of emitted fluorescence photons for a Besselian illumination light beam having a higher total power, so that in the region of comparatively high intensities, thus at the position of the main maximum (z=0), significant saturation effects occur and the number of the emitted fluorescence photons scales nonlinearly with the intensity of the illumination light beam. The difference between the two curves B6, B7 is also an advantageous measured variable here, since as in the exemplary embodiment according to FIG. 5a, it is concentrated in a narrow region around z=0, i.e., only there assumes a value which is significantly different from zero.

FIGS. 6a to 6d show a special exemplary embodiment of the method according to the invention. In the exemplary embodiment shown, the resolution is increased in that the two raw images of the specimen 36 are offset with one another, which have been recorded upon simultaneous superposition of a first partial light beam and a second partial light beam, wherein the ratios of the powers of these two partial light beams to one another are varied from the recording of the first raw image to the recording of the second raw image. The two raw images are recorded in the exemplary embodiment shown for different powers of the weaker, second beam and identical power of the stronger, first partial light beam.

Figure 6:
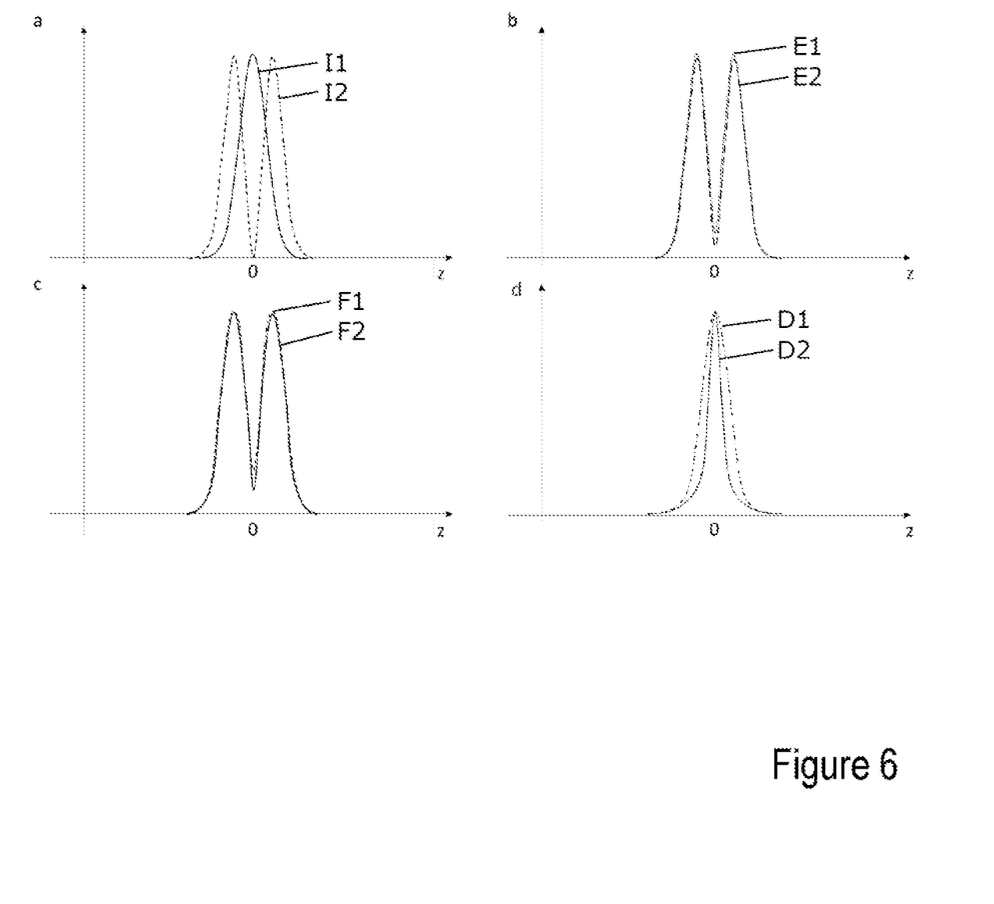
FIG. 6a shows a diagram in which intensity profiles of the first partial light beam and the second partial light beam are shown.
FIG. 6b shows a diagram in which two intensity profiles of exemplary superpositions of the first and the second partial light beam from FIG. 6a to produce two illumination light beams are shown.
FIG. 6c shows a diagram in which the effective intensity profiles of the fluorescence of the specimen upon illumination by means of the two illumination light beams from FIG. 6b are shown.
FIG. 6d shows a diagram in which exemplary effective fluorescence intensity profiles are shown, as result when the method as shown in FIGS. 6a to 6c is carried out.

FIG. 6a is a diagram in which intensity profiles I1, I2 (and thus the beam profiles) of the first partial light beam (with intensity profile I1) and the second partial light beam (with intensity profile I2) are shown. The profiles of the two partial light beams are scaled in the illustration in FIG. 6a to their respective intensity maxima. The position z perpendicular to the propagation direction of the respective partial light beam is plotted on the abscissa axis. The intensity of the respective partial light beam scaled to a maximum value of 1 is plotted on the ordinate axis. The first partial light beam has an intensity maximum at z=0. The second partial light beam has a zero point enclosed by two intensity maxima at z=0. The two partial light beams are superimposed in the target region 34 of the specimen 36 to produce the respective illumination light beam (see FIG. 1).

FIG. 6b is a diagram in which two intensity profiles E1, E2 of exemplary different superpositions (in the meaning of linear combinations) of the first and the second partial beam according to FIG. 6a for illuminating the specimen 36 are shown upon the recording of the first or second raw image, respectively. The position z perpendicular to the propagation direction of the respective light beam is plotted on the abscissa axis. The intensity profile of two illumination light beams, which result from two different superpositions of the two partial light beams having the two scaled intensity profiles I1, I2 shown in FIG. 6a, is shown on the ordinate axis. The following equation applies: $E1=a_1 \cdot I1+b_1 \cdot I2$, $E2=a_2 \cdot I1+b_2 \cdot I2$. The coefficients $a_i$, $b_i$ each specify the weighting of the two scaled intensity profiles I1, I2 in relation to one another in the illumination light beam produced by superposition. The coefficients $a_i$, $b_i$ are therefore also a measure of the power of the respective partial light beams used to produce the respective illumination light beam. In the exemplary embodiment shown, the illumination light beams only differ in the power of the first partial light beam used—wherein the power of the first used partial light beam for the second illumination light beam E2 is very much less than for the first illumination light beam E1 (thus $a_2 \ll a_1$). This results in a different resulting intensity profile in particular at z=0. The power of the second partial light beam used is equal for the first and the second illumination light beam (thus $b_1=b_2$). The two intensity profiles of the illumination light beams E1, E2 are each scaled in FIG. 6b to the maximum intensity of the second partial light beam used. The power of the second partial light beam used—and thus the maximum intensity—is significantly higher both for the first and also the second illumination light beam than the power and thus the maximum intensity of the first partial light beam used. The second partial light beam used ensures, due to its high intensity in the regions of the two maxima, an extensive saturation of the fluorophores in the specimen 36.

FIG. 6c is a diagram in which the effective intensity profiles F1, F2 of the fluorescence of the specimen 36 upon illumination by means of the two illumination light beams according to FIG. 6b are shown. The position z perpendicular to the propagation direction of the respective light beam is plotted on the abscissa axis. The fluorescence signal scaled to its respective maximum is plotted on the ordinate axis. It can be seen well in FIG. 6c that upon the recording of each of the two raw images, a saturation of the fluorophores occurs in the regions of the two maxima, whereby the different powers of the first partial light beams used hardly have an effect on the fluorescence excited in this region. At z=0, in contrast, where the second partial light beam has a zero point and therefore only excites few fluorophores in spite of high power, saturation effects do not occur, and a change of the power of the first partial light beam has a strong effect on the fluorescence excited in this region. The first raw image, which acquires fluorescence excited by the first illumination light beam E1, and the second raw image, which acquires fluorescence excited by the second illumination light beam E2, therefore primarily differ in the region around z=0 (thus for z=0 and close to z=0). Therefore, if the raw images produced by means of the different illumination light beams E1, E2 are subtracted from one another, this results in a resolution improvement, as explained in the following on the basis of FIG. 6d.

FIG. 6d is a diagram in which exemplary effective fluorescence intensity profiles D1, D2 are shown, as result when the method as shown in FIGS. 6a to 6c is carried out. The two effective fluorescence intensity profiles D1, D2 result from the difference of the two intensity profiles F1, F2 shown in FIG. 6c. These therefore correspond to the subtraction of two raw images according to an embodiment of the invention. The two effective fluorescence intensity profiles D1, D2 show two different exemplary cases: The first intensity profile D1 shows the case that the power of the second partial light beam (reference sign 12 in FIG. 6a) is not so strong that the resulting illumination light beam results in substantial saturation in the region of its intensity maxima. In contrast, the second intensity profile D2 results for a power of the second partial light beam at which the intensity in the region of the maxima is sufficiently high for saturation of the fluorophores. The powers of the first partial light beams used are identical for the two effective fluorescence intensity profiles D1, D2. The two effective fluorescence intensity profiles D1, D2 each have a maximum at z=0. The shape of the second effective fluorescence intensity profile D2 clearly shows that for a high power of the second partial light beam used, the first effective fluorescence intensity profile D1 significantly narrows. This narrowing corresponds to an increase of the resolution along the z axis.

Figure 7:
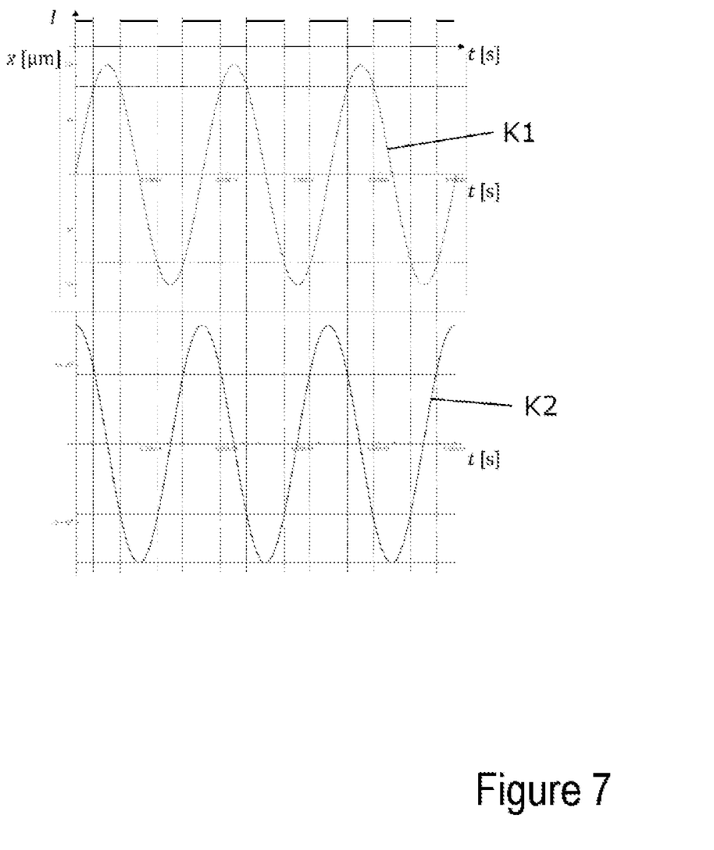
FIG. 7 shows a diagram in which the position of an illumination light beam in a target region of a specimen and the velocity of the illumination light beam as a function of time are shown.

FIG. 7 is a diagram in which the position x of an illumination light beam 24a, 24b in the target region 34 of the specimen 36 and the velocity v of the illumination light beam 24a, 24b as a function of time t are shown. The position x of the illumination light beam 24a, 24b perpendicular to the propagation direction of the respective illumination light beam 24a, 24b is shown as a first curve K1, which has the shape of a sine curve having a period P. The velocity of the illumination light beam 24a, 24b is shown as a second curve K2 which has the shape of a sine curve which is offset by one-fourth of the period P of the first curve K1 in relation to the first curve K1. In the exemplary embodiment according to FIG. 7, the amplitude of the first curve K1 is 100 μm. The frequency of the first curve is f=12 kHz. The target region on a length of approximately 160 μm can therefore be scanned at an approximately constant velocity by the illumination light beam 24a, 24b. The absolute value of the approximately constant velocity is >5 μm/μs. The specimen 36 can therefore be illuminated in a region of approximately 160 μm by a beam which is moved at a scanning velocity of at least 5 μm/μs over the specimen. The illumination of the specimen 36 by means of the illumination light beam 24a, 24b can take place either bidirectionally or unidirectionally. In the case of the bidirectional illumination, the time interval between two successive illuminations is 15 μs. In the case of the unidirectional illumination, the time interval between two successive illuminations is 83 μs. It is also possible that the specimen 36 is illuminated by means of a pulsed illumination light beam, for example at a frequency of 1 pulse/μs=1 MHz.

Figure 8:
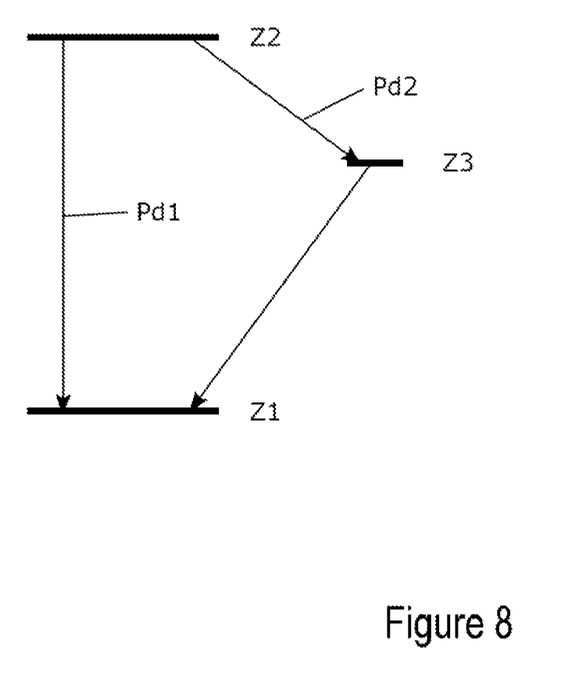
FIG. 8 shows a simplified energy level scheme of fluorophores.

FIG. 8 shows a simplified energy level scheme of the fluorophores, which are arranged in the target region 34 of the specimen 36. The energy level scheme shows the first state Z1, which corresponds to a ground state of the fluorophores, the second state Z2, which corresponds to an excited state of the fluorophores, and a third state Z3, which corresponds to a metastable state of the fluorophores.

The fluorophores are excited from the first state Z1 into the second state Z2 by the illumination by means of the two illumination light beams 24a, 24b. Upon the transition from the second state Z2 back into the first state Z1, the fluorophores emit fluorescence photons which form the fluorescent light 38. This transition is identified by an arrow Pd1 in FIG. 8. Instead of passing back into the first state Z1, the fluorophores can also pass out of the second state Z2 into the third state Z3. This transition is identified by an arrow Pd2 in FIG. 8. However, the transition probability from the second state Z2 into the third state Z3 is significantly less, for example less by a factor of 100, preferably by a factor of 1000, than the transition probability from the second state Z2 into the first state Z1. The lifetime of the second state Z2 is, for example, between 1 ns and 100 ns. The lifetime of the third state Z3 is, for example, between 10 μs and 1 ms. Due to its comparatively long lifetime, the third state Z3 is also referred to as a metastable state.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 microscope
12 illumination device
14 image generating device
16 image processing device
20 illumination light
22 beam forming unit
24, 24a, 24b, 25a, 25b illumination light beam
26 beam deflection unit
28 illumination optical unit
30 telecentric system
32 illumination objective
34 target region
36 specimen
38 fluorescent light
40 detection optical unit
42 detection objective
44 tube lens
46 emission filter
48 sensor element
50 microscope
52 illumination device
54 unit
56, 58 beam forming unit
60, 62 beam splitter
64, 66 deflection mirror
68, 78 region
B1, B2, B3, B4, B5, B6, curve
B7, G1, G2, G3, G4, G5,
G6, G7
D1, D2, E1, E2, F1, F2, intensity profile
I1, I2
I intensity
x, z position
V velocity

The invention claimed is:

1. A method for high-resolution imaging of a specimen by light microscopy, the method comprising:
   illuminating a target region of the specimen by a first illumination light beam during a first holding duration, in order to transfer at least a first subset of fluorophores in the specimen from a first state into a second state, wherein the first subset of the fluorophores emits first fluorescence photons upon transitioning from the second state back into the first state, and wherein the first fluorescence photons are used to produce a first raw image;
   illuminating the target region of the specimen by a second illumination light beam, which has a power different from a power of the first illumination light beam or a beam profile different from a beam profile of the first illumination light beam, during a second holding duration, in order to transfer at least a second subset of the fluorophores in the specimen from the first state into the second state, wherein the second subset of the fluorophores emits second fluorescence photons upon transitioning from the second state back into the first state, and wherein the second fluorescence photons are used to produce a second raw image; and
   producing a high-resolution image of the specimen from the first raw image and the second raw image,
   wherein the first holding duration and the second holding duration are shorter than a lifetime of a third state of the fluorophores, into which a third subset of the fluorophores is transferred by the illumination of the target region of the specimen by the first illumination light beam or the second illumination light beam, and the lifetime of the third state is longer by a factor of at least 2 than a lifetime of the second state.

2. The method as claimed in claim 1, wherein the first holding duration or the second holding duration is shorter than the lifetime of the second state.

3. The method as claimed in claim 1, wherein the target region of the specimen is repeatedly illuminated by the first illumination light beam and the second illumination light beam.

4. The method as claimed in claim 1, wherein the first illumination light beam and the second illumination light beam are generated by a pulsed light source, and wherein a pulse length respectively corresponds to the first holding duration or the second holding duration.

5. The method as claimed in claim 4, wherein a time interval between two consecutive pulses of the first illumination light beam or the second illumination light beam is longer than the lifetime of the second state.

6. The method as claimed in claim 4, wherein the time interval between two consecutive pulses of the first illumination light beam or the second illumination light beam is shorter than the lifetime of the third state.

7. The method as claimed in claim 1, wherein a light sheet illuminating the target region of the specimen is formed from the first illumination light beam or the second illumination light beam.

8. The method as claimed in claim 1, wherein a point pattern illuminating the target region of the specimen is formed from the first illumination light beam or the second illumination light beam.

9. The method as claimed in claim 1, wherein a noise reduction operation is applied to the first raw image and the second raw image.

10. The method as claimed in claim 1, wherein, in a scope of further processing, the first raw image is scaled or weighted with the power of the first illumination light beam and the second raw image is scaled or weighted with the power of the second illumination light beam.

11. The method as claimed in claim 1, wherein the high-resolution image of the specimen is produced by the first raw image or an image produced from the first raw image being subtracted from the second raw image or an image produced from the second raw image.

12. A microscope for high-resolution imaging of a specimen by light microscopy, the microscope comprising:
an illuminator configured to:
  illuminate a target region of the specimen by a first illumination light beam during a first holding duration in order to transfer at least a first subset of fluorophores in the specimen from a first state into a second state, wherein the first subset of the fluorophores emits first fluorescence photons upon transitioning from the second state back into the first state, and
  illuminate the target region of the specimen by a second illumination light beam, which has a power different from a power of the first illumination light beam or a beam profile different from a beam profile of the first illumination light beam, during a second holding duration, in order to transfer at least a second subset of the fluorophores in the specimen from the first state into the second state, wherein the second subset of the fluorophores emits second fluorescence photons upon transitioning from the second state back into the first state;
an image generator configured to produce a first raw image from the first fluorescence photons emitted by the first subset of the fluorophores and to produce a second raw image from the second fluorescence photons emitted by the second subset of the fluorophores; and
an image processor configured to produce a high-resolution image of the specimen from the first raw image and the second raw image,
wherein illuminator is configured in such a way that the first holding duration and the second holding duration are shorter than a lifetime of a third state of the fluorophores into which a third subset of the fluorophores is transferred by the illumination of the target region of the specimen by the first illumination light beam or the second illumination light beam and the lifetime of the third state is longer at least by a factor of 2 than a lifetime of the second state.

13. The microscope as claimed in claim 12, wherein the microscope is a light sheet microscope or a confocal microscope.

14. The microscope as claimed in claim 12, wherein the illuminator comprises a pulsed light source.

15. The microscope as claimed in claim 12, wherein the illuminator comprises a beam deflector configured to move the illumination beam over the specimen.

16. The microscope as claimed in claim 12, wherein the image generator comprises a surface sensor element configured to acquire the first raw image and the second raw image.

* * * * *